(12) United States Patent
Nakagiri et al.

(10) Patent No.: US 8,537,346 B2
(45) Date of Patent: Sep. 17, 2013

(54) INDUSTRIAL ROBOT ARM REFERENCE POSITION DETERMINING METHOD AND INDUSTRIAL ROBOT

(75) Inventors: Hiroshi Nakagiri, Osaka (JP); Sungjae Yoon, Osaka (JP); Tatsuji Minato, Fujisawa (JP); Makoto Kondo, Fujisawa (JP)

(73) Assignee: Kabushiki Kaisha Kobe Seiko Sho, Kobe-shi (JP)

( * ) Notice: Subject to any disclaimer, the term of this patent is extended or adjusted under 35 U.S.C. 154(b) by 263 days.

(21) Appl. No.: 13/085,931

(22) Filed: Apr. 13, 2011

(65) Prior Publication Data

US 2011/0252912 A1 Oct. 20, 2011

(30) Foreign Application Priority Data

Apr. 14, 2010 (JP) ................................. 2010-093151

(51) Int. Cl.
*G01B 11/26* (2006.01)
*G01C 1/00* (2006.01)

(52) U.S. Cl.
USPC ................ 356/139.07; 356/141.1; 356/152.2

(58) Field of Classification Search
USPC ............. 356/138, 139.04, 139.07; 250/3.13, 250/3.16
See application file for complete search history.

(56) References Cited

U.S. PATENT DOCUMENTS 5,570,609 A 11/1996 Nihei et al.

FOREIGN PATENT DOCUMENTS

| JP | 6-210586 | 8/1994 |
| JP | 10-34572 | 2/1998 |
| JP | 2009-000778 | 1/2009 |

OTHER PUBLICATIONS

Office Action mailed May 31, 2013 in Chinese Patent Application No. 201110097717.9.

*Primary Examiner* — Isam Alsomiri
*Assistant Examiner* — Samantha K Abraham
(74) *Attorney, Agent, or Firm* — Oblon, Spivak, McClelland, Maier & Neustadt, L.L.P.

(57) ABSTRACT

A light emitter 320 is so mounted to a mounting portion 170 provided at a predetermined position of the tool mounting rotation arm 160 that a light beam LB is emitted toward a swing arm 150, the light beam LB is caused to be emitted from the light emitter 320, and the swing arm 150 and the tool mounting rotation arm 160 are so positioned that the light beam LB from the light emitter 320 is irradiated to an allowable range of a light receiving portion 410 for receiving the light beam LB from the light emitter 320.

8 Claims, 9 Drawing Sheets

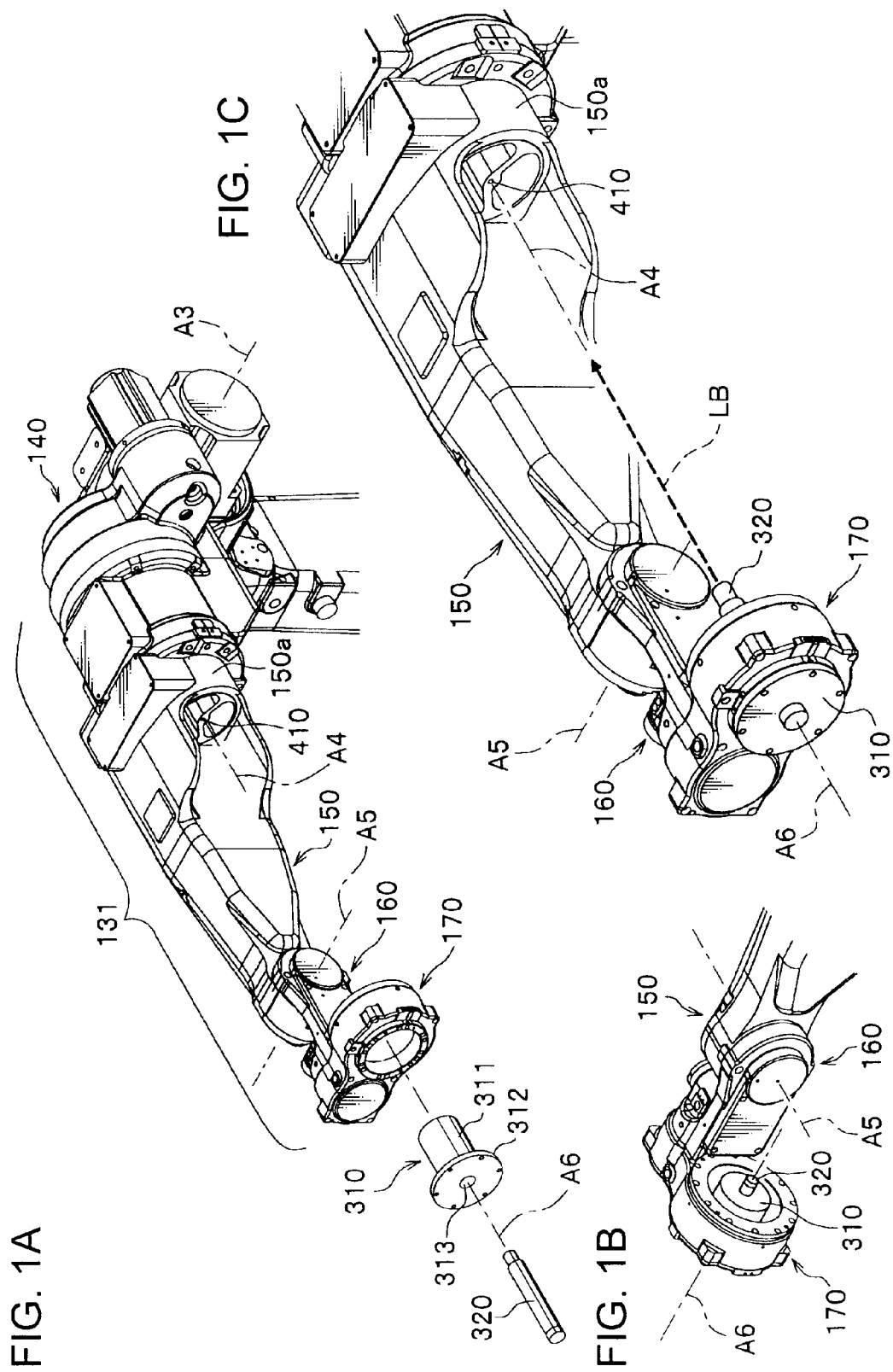

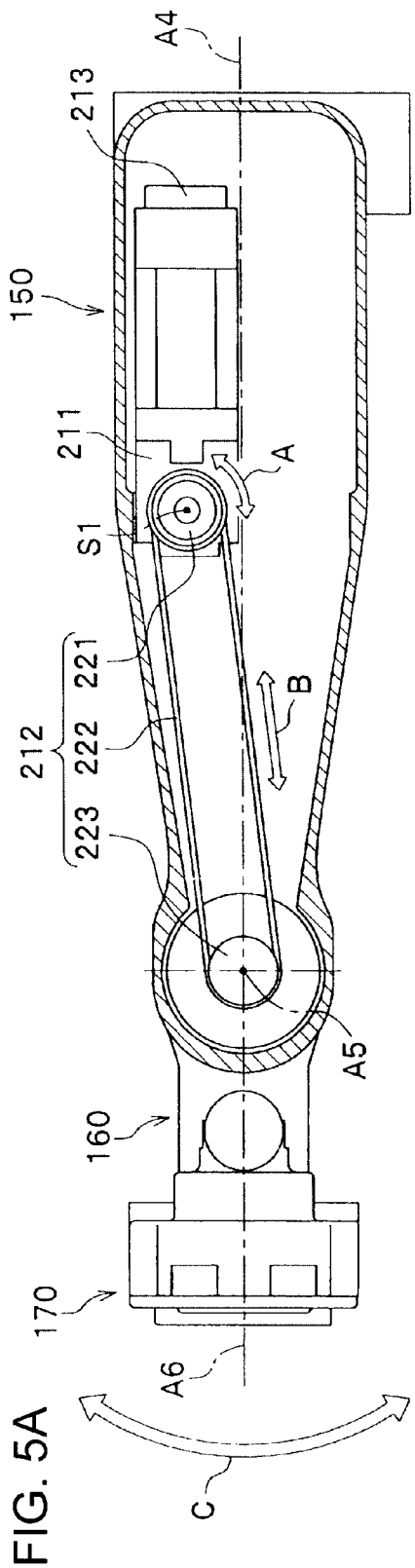
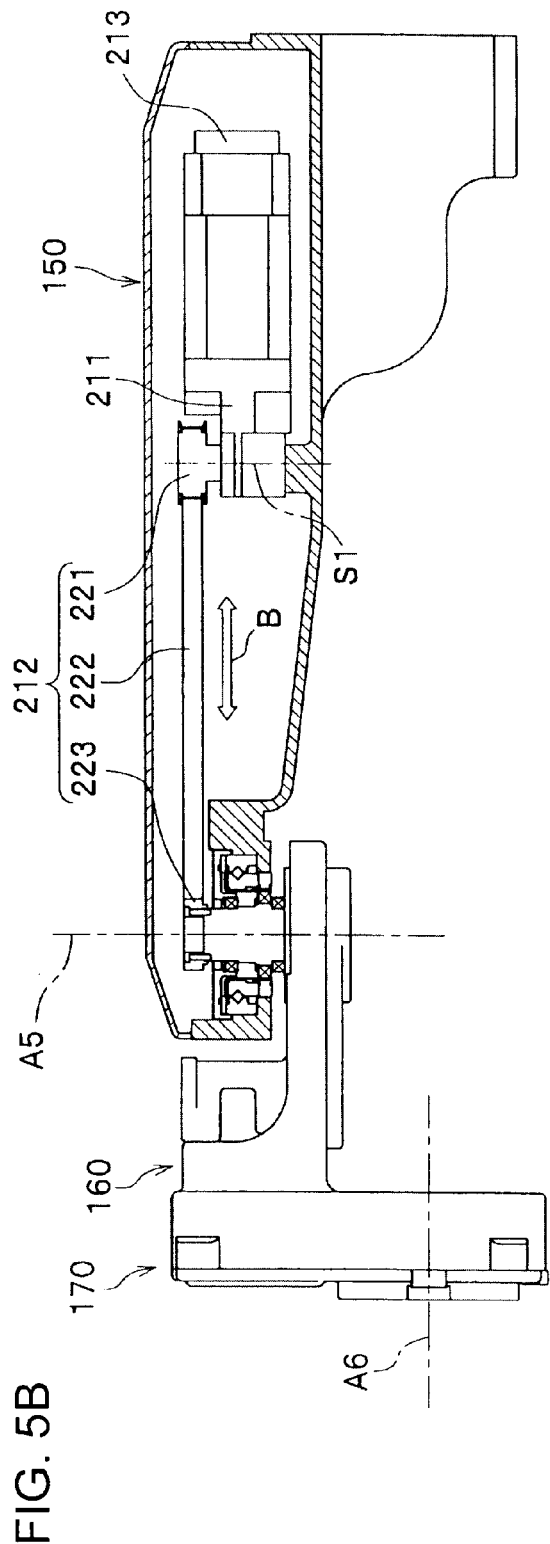
FIG. 5A
FIG. 5B

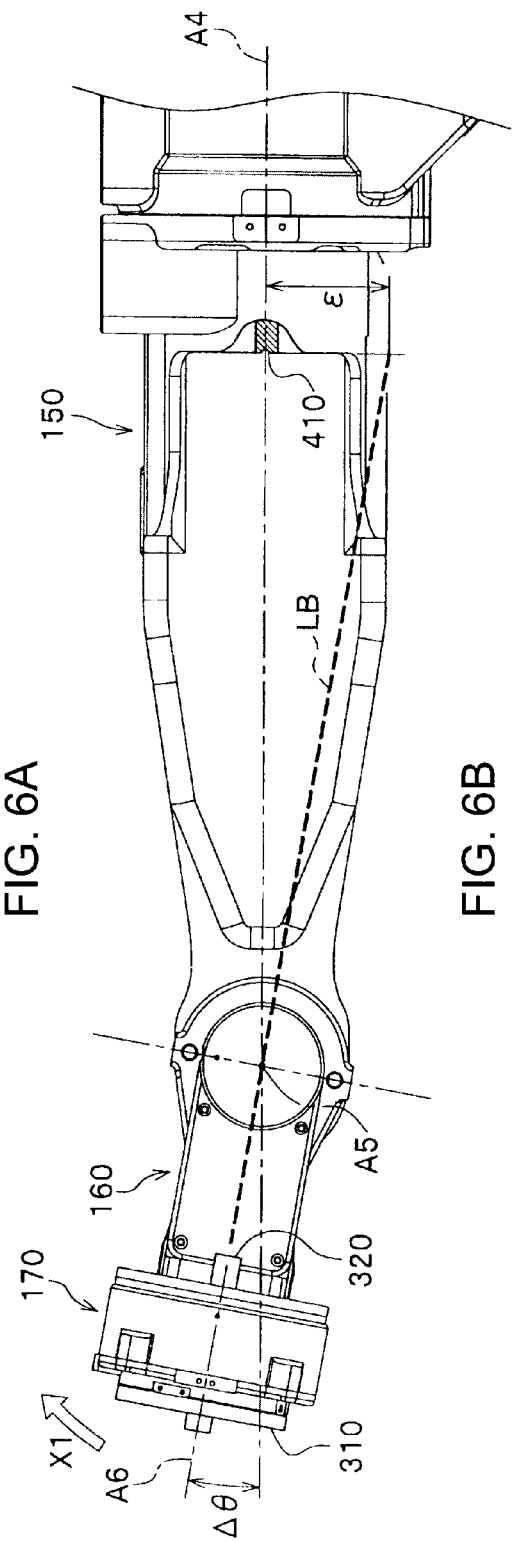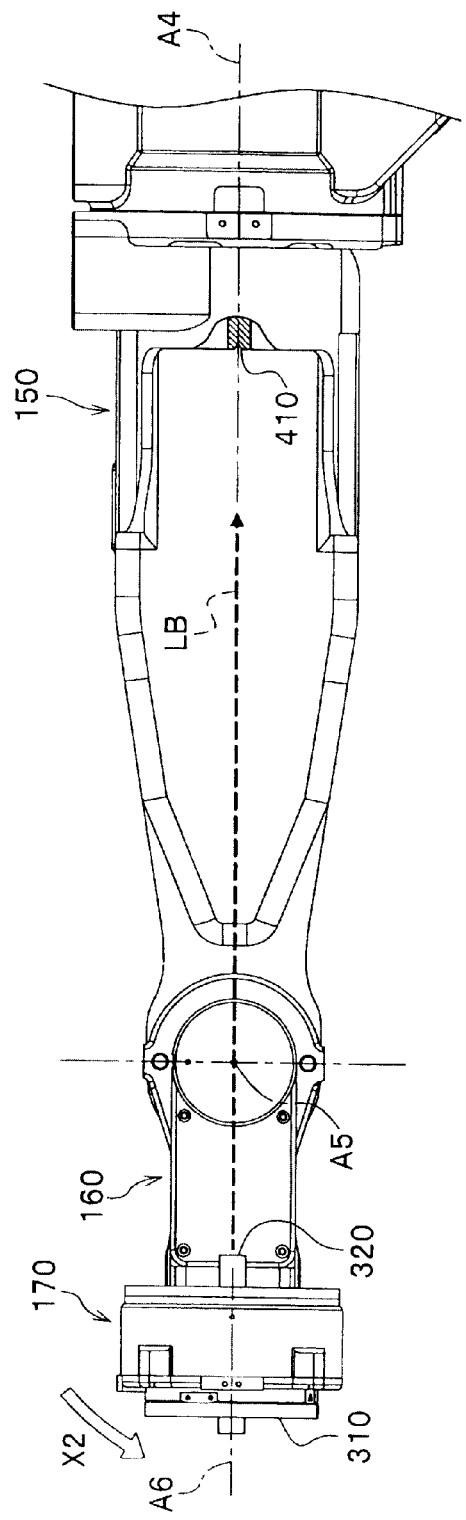

INDUSTRIAL ROBOT ARM REFERENCE POSITION DETERMINING METHOD AND INDUSTRIAL ROBOT

BACKGROUND OF THE INVENTION

1. Field of the Invention

The present invention relates to a method for determining a reference position of an arm of an industrial robot to position the arms of the industrial robot at the reference position, and an industrial robot.

2. Description of the Related Art

Generally, so-called articulated robots and other robots are widely used as industrial robots such as welding robots. An articulated robot includes, for example, built-in motor, power transmission mechanism, encoder and the like in each joint, counts pulses supplied from the encoders with reference positions set at "0", detects rotational positions of arms based on count values and performs a control to drive the arms to desired rotational positions instructed by a program.

When motors for driving arms, power transmission mechanisms for transmitting drive forces of the motors to the arms and the like are incorporated into an articulated robot such as in the case of producing a new robot, relative positions of the arms and relative positions of the arms and the motors or power transmission mechanisms are not specified. This requires an operation of positioning the arms and the like at reference positions.

When a drive motor or power transmission mechanism is replaced such as in the case of removing a motor for driving an arm, a power transmission mechanism for transmitting a drive force of the motor or the like from a robot due to a failure or the like and mounting a new motor or power transmission mechanism, relative positions of arms or relative positions of the arm and the motor or power transmission mechanism may be shifted. Thus, after the replacement of the motor, the power transmission mechanism or the like, an operation of positioning the arms and the like at reference positions is necessary to cause the robot to move as before in accordance with an existing program.

For a positioning operation, there is a method for positioning a tool mounting rotation arm on a swing arm by providing the swing arm with a reference pin, providing the tool mounting rotation arm to be driven and rotated relative to the swing arm with a projection and bringing the projection of the tool mounting rotation arm into contact with the reference pin of the swing arm for adjusting a fifth-axis (A12) reference position of a six-axis articulated robot as disclosed, for example, in Japanese Unexamined Patent Publication No. H06-210586 (hereinafter, referred to as "patent literature 1"). Alternatively, a method for positioning a tool mounting rotation arm on a swing arm using a scribe line formed around a rotation axis of the tool mounting rotation arm has been proposed for a positioning operation.

Further, a reference position determining method for setting a reference position by fixing a jig including a tapered hole to a robot base, fixing a jig to be fitted into the tapered hole formed in the jig fixed to the robot base to a robot wrist (tool mounting portion) and fitting the jig fixed to the robot wrist into the tapered hole of the jig fixed to the robot base as disclosed in Japanese Unexamined Patent Publication No. H10-34572 (hereinafter, referred to as "patent literature 2") has been proposed as another reference position determining method.

A method for determining a reference position of a tool mounting rotation arm using a level or the like is also used in industrial robots.

FIG. 10 are diagrams showing a conventional method for positioning arms of an industrial robot. FIG. 10A is a plan view of an essential part of the industrial robot, FIG. 10B is a side view of the essential part of the industrial robot in a normal adjusted state and FIG. 10C is a side view of the essential part of the industrial robot in the event of maladjustment.

In the method for determining a reference position of a tool mounting rotation arm using a level or the like, a level 613 is first mounted on a swing arm 611 as shown in FIGS. 10A and 10B and an operator adjusts the position of the swing arm 611 by rotating the swing arm 611 about a motion axis (third axis) A11 thereof so that the swing arm 611 becomes horizontal while watching the level 613. Note that the motion axis (third axis) A11 of the swing arm 611 is a center of rotation of the swing arm 611 and, for example, an axis extending in a direction parallel to a mounting surface of the industrial robot.

Subsequently, the level 613 is mounted on a tool mounting rotation arm 612 and the operator adjusts a reference position of the tool mounting rotation arm 612 by rotating the tool mounting rotation arm 612 about a motion axis (fifth axis) A12 thereof so that the tool mounting rotation arm 612 becomes horizontal while watching the level 613. The motion axis A12 is a center of rotation of the tool mounting rotation arm 612 and an axis parallel to the motion axis A11. At this time, the tool mounting rotation arm 612 is positioned at a reference position when the swing arm 611 is in a horizontal state and the tool mounting rotation arm 612 is in a horizontal state as shown in FIG. 10B.

However, with the reference position determining method disclosed in patent literature 1, positioning accuracy is poor since a movement amount of a positioning portion is small relative to a rotational displacement if positioning is performed in a place where a long distance from a center of rotation of a tip part or the like to the positioning portion cannot be ensured. For example, in a welding robot or the like, a wrist and its vicinity where a welding tool is to be attached is designed to be as small as possible for the purpose of facilitating entrance of the welding tool into a narrow place to be welded. Thus, a long distance from a center of a rotating shaft for positioning to a place where positioning is watched cannot be ensured, wherefore adjustment accuracy cannot be improved.

Further, the reference position determining method disclosed in patent literature 2 requires the jig to be mounted on the robot base and a surrounding area, e.g. a work area becomes narrower due to the jig. Since the robot in a posture for reference position adjustment projects into the work area, the robot cannot take the posture for reference position adjustment at a site of work. Since the reference position is adjusted using a plurality of shafts (two shafts to all shafts), positioning is performed regardless of individual position shifts, wherefore the reference positions of the individual arms may not be correctly adjusted. Further, since many parts are required for reference position determination, installation errors of the parts increase and adjustment accuracy cannot be improved.

Further, the method for mounting the level 613 on the upper surfaces of the swing arm 611 and the tool mounting rotation arm 612 and setting the reference positions in the state where both the swing arm 611 and the tool mounting rotation arm 612 are in the horizontal state as shown in FIG. 10 requires the level 613. To determine reference positions with high accuracy, a high-accuracy level is necessary, but it is expensive. Further, even if the tool mounting rotation arm 612 is horizontal, an error θ of the swing arm 611 is reflected as an error of the tool mounting rotation arm 612 as shown in FIG. 10C and accurate positioning cannot be performed. Further, an adjustment becomes cumbersome.

SUMMARY OF THE INVENTION

The present invention was developed in view of the above points and an object thereof is to provide an industrial robot arm reference position determining method and an industrial robot capable of accurately determining reference positions of a swing arm and a tool mounting rotation arm by a simple construction.

In order to accomplish the above object, the present invention is directed to a method for determining a reference position of an arm of an industrial robot to position a swing arm and a tool mounting rotation arm mounted to the swing arm via a rotation axis, comprising the steps of:

mounting a light emitter to a mounting portion provided at a predetermined position of the tool mounting rotation arm such that a light beam is emitted toward the swing arm;

causing the light beam to be emitted from the light emitter;

providing a light receiving portion for receiving the light beam from the light emitter at a predetermined position of the swing arm facing the mounting portion;

setting a predetermined allowable range on the light receiving portion; and positioning the swing arm and the tool mounting rotation arm such that the light beam from the light emitter is irradiated to the set allowable range.

According to the above construction (process), the reference position of the tool mounting rotation arm can be determined without depending on the inclination of the swing arm by irradiating the light beam to the light receiving portion and positioning the tool mounting rotation arm relative to the swing arm. Further, since the light beam has excellent linearity, a long distance from a pivot shaft of the tool mounting rotation arm to the light receiving portion as an adjustment part can be ensured. Therefore, adjustment accuracy can be improved.

These and other objects, features and advantages of the present invention will become apparent upon reading of the following detailed description along with the accompanying drawings.

BRIEF DESCRIPTION OF DRAWINGS

FIG. 1 are diagrams showing one embodiment of a method for determining a reference position of an industrial robot according to the present invention, wherein FIG. 1A is a perspective view of a swing arm and its vicinity when a light emitter is removed, FIG. 1B is a perspective view of the swing arm and its vicinity when the light emitter is mounted, and FIG. 1C is a perspective view of a tool mounting rotation arm and its vicinity when the light emitter is mounted on, FIG. 2 are construction diagrams of a light receiving portion and its vicinity according to one embodiment of an industrial robot according to the present invention, wherein FIG. 4 is a block construction diagram of the embodiment of the industrial robot according to the present invention, FIG. 5 are construction diagrams of the embodiment of the industrial robot according to the present invention, wherein FIG. 5A is a side view partly in section and FIG. 5B is a plan view partly in section, FIG. 6 are diagrams showing a method for adjusting a reference position of an arm as one embodiment of a robot arm according the present invention, wherein FIG. 6A is a side view of arms before adjustment of a tool mounting rotation arm and FIG. 6B is a side view of the arms after adjustment of the tool mounting rotation arm, FIG. 7 are diagrams showing adjustment accuracy in the embodiment of the robot according to the present invention, wherein FIG. 9 is a flow chart of a process of a robot controller according to the other embodiment of the industrial robot according to the present invention, FIG. 10 are diagrams showing an example of a method for positioning an arm of a conventional industrial robot, wherein

DETAILED DESCRIPTION OF INVENTION

First, an overall external configuration of an industrial robot 100 employing an industrial robot arm reference position determining method according to the present invention is described with reference to FIG. 3.

Figure 3:
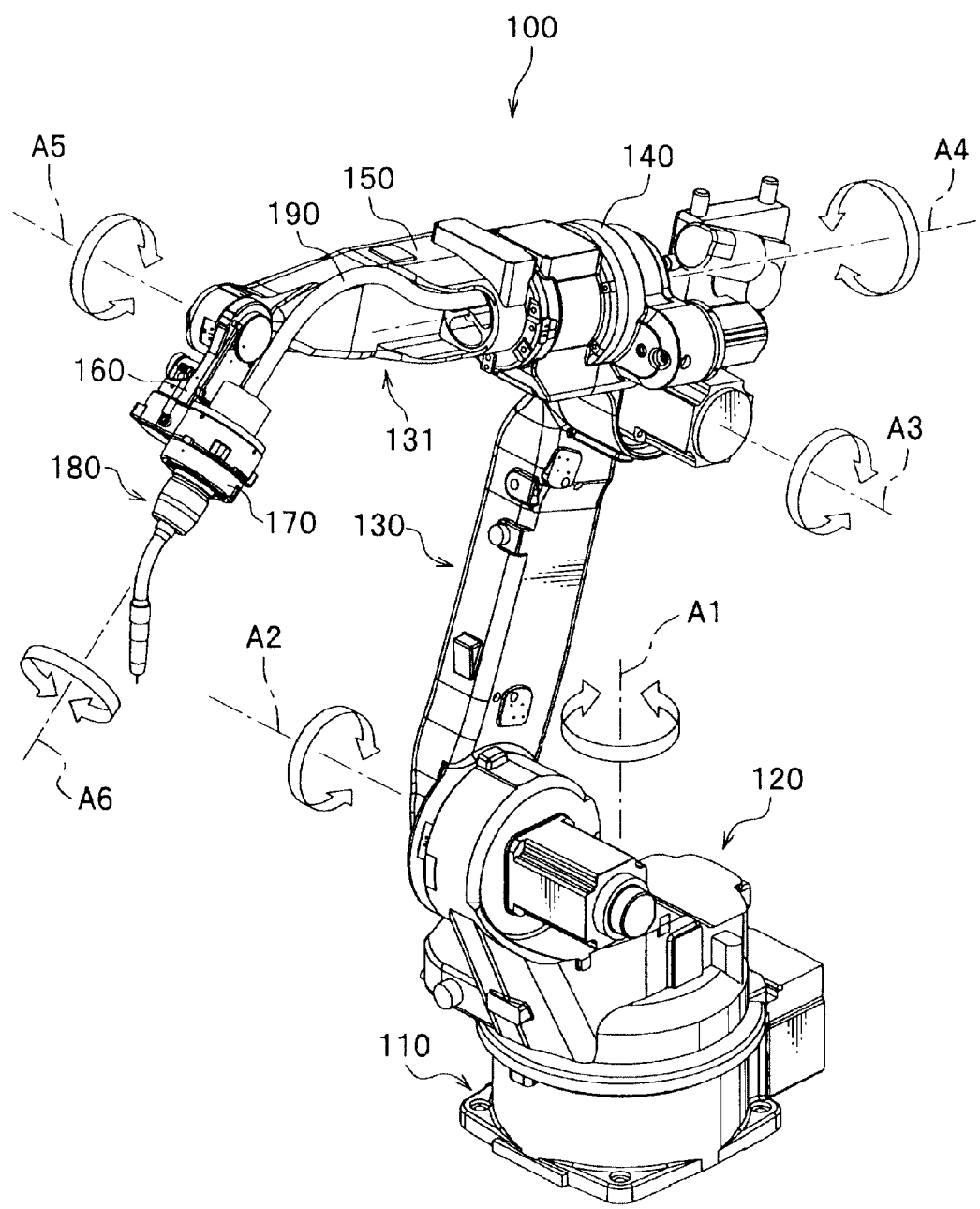
FIG. 3 is a perspective view of the embodiment of the industrial robot according to the present invention.

The industrial robot 100 of this embodiment is a so-called six-axis articulated robot and includes a robot base 110 to be fixed to a mounting surface, a rotation arm 120 which rotates about a first axis A1 on the robot base 110, a lower arm 130 which is connected to the rotation arm 120 and rotates about a second axis A2, and an upper arm 131 which is connected to the lower arm 130 and rotates about a third axis A3 as shown in FIG. 3.

The robot base 110 is fixed, for example, to a predetermined mounting surface such as a floor surface of a work site. The rotation frame 120 is so mounted on the robot 110 as to be driven and rotated about the first axis A1. The first axis A1 is an axis extending in a direction orthogonal to the mounting surface. The rotation frame 120 is so mounted on the robot base 110 that the lower arm 130 can be driven and rotated about the second axis A2.

The lower arm 130 has one end so mounted on the rotation frame 120 as to be driven and rotated about the second axis A2. The second axis A2 is an axis extending in a direction orthogonal to the first axis A1 and parallel to the mounting surface. The upper arm 131 is so mounted to the lower arm 130 as to be driven and rotated about the third axis A3.

The upper arm 131 includes a shoulder 140 which is connected to the lower arm 130 and rotates about the third axis A3, a swing arm (fifth-axis arm) 150 which is connected to the shoulder 140 and rotates about a fourth axis A4, a tool mounting rotation arm (end arm) 160 which is connected to the swing arm 150 and rotates about a fifth axis A5 and a tool mounting portion 170 which is mounted to the tool mounting rotation arm 160 and rotates about a sixth axis A6.

The shoulder 140 is so mounted on the other end of the lower arm 130 as to be able to be driven and rotated about the third axis A3. The third axis A3 is an axis about which the swing arm 150 is vertically driven and which extends in a direction parallel to the second axis A2. One end of the swing arm 150 is mounted to the shoulder 140 in a direction orthogonal to the third axis A3. The swing arm 150 is so mounted as to be driven and rotated about the fourth axis A4. The fourth axis A4 is an axis extending in a direction orthogonal to the third axis A3.

The tool mounting rotation arm 160 has one end mounted to the other end of the swing arm 150 to be driven and rotated about the fifth axis A5. The fifth axis A5 corresponds to a rotation axis in claims and is an axis extending in a direction parallel to the third axis A3 and orthogonal to the fourth axis A4.

The tool mounting portion 170 has a substantially cylindrical shape and is mounted to the other end of the tool mounting rotation arm 160 to be driven and rotated about the sixth axis A6, and a tool 180 is mounted thereto. The sixth axis A6 is an axis orthogonal to the fifth axis A5 and crosses the fourth axis A4 on the fifth axis A5, and the tool mounting portion 170 is rotated about this axis. The tool 180 is inserted into an inner peripheral side of the tool mounting portion 170 to be mounted to the tool mounting portion 170. The tool 180 is locked in the tool mounting portion 170 by a locking mechanism. The tool 180 is, for example, a welding tool and connected to a cable 190 at a side of the tool mounting portion 170 toward the swing arm 150. Further, the tool mounting portion 170 is so configured that a mounting member 310 is to be mounted thereto.

Next, a block construction of a control system of the industrial robot 100 is described with reference to FIG. 4.

Figure 4:
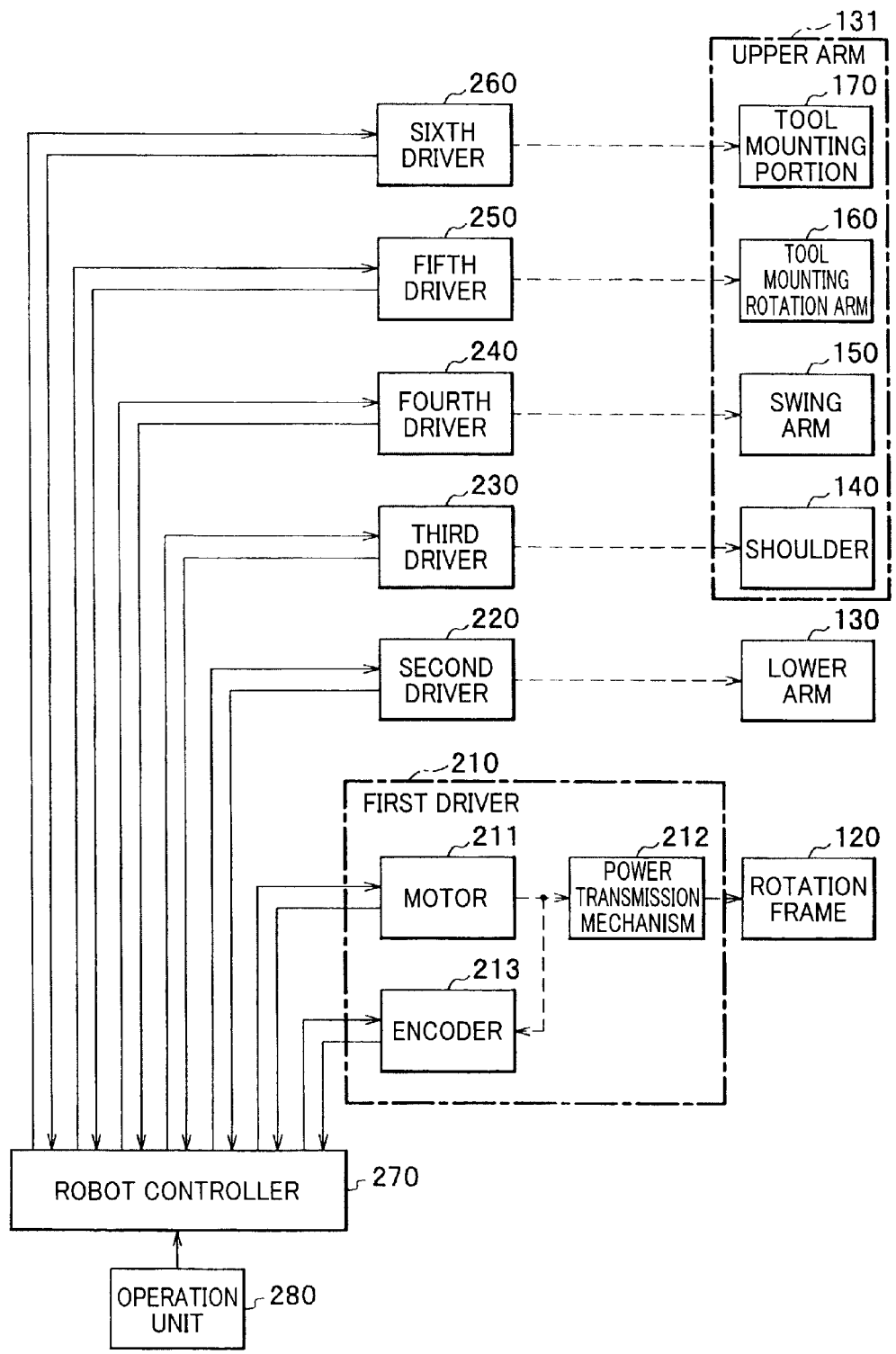

The rotation frame 120 is connected to a first driver 210 as shown in FIG. 4 and driven and rotated about the first axis A1 by the first driver 210. The first driver 210 includes a motor 211, a power transmission mechanism 212, an encoder 213 and the like. The motor 211 is connected to a robot controller 270 and rotated by a drive signal supplied from the robot controller 270.

A rotating shaft of the motor 211 is connected to the rotation frame 120 via the power transmission mechanism 212. The power transmission mechanism 212 includes, for example, a timing belt, a reduction gear mechanism and the like and transmits the rotation of the motor 211 to the rotation frame 120 to rotate the rotation frame 120 about the first axis A1. The encoder 213 is, for example, composed of a rotary encoder and the like and outputs a pulse indicating rotation angle information of the rotating shaft of the motor 211. The pulse output from the encoder 213 is supplied to the robot controller 270.

The robot controller 270 multiplies a reduction ratio of the power transmission mechanism based on the pulse indicating the rotation angle information obtained from the encoder 213 to recognize a rotational position of the rotation frame 120. The robot controller 270 controls a rotating direction and a rotating amount of the motor 211 so that the rotational position of the rotation frame 120 becomes a desired position. Further, an operation unit 280 is connected to the robot controller 270 to enable an operation by an operator. The operation unit 280 is, for example, composed of a remote controller and the like and configured to enable a remote operation of the operator.

The lower arm 130 is connected to a second driver 220 as shown in FIG. 4 and driven and rotated about the second axis A2 by the second driver 220. The shoulder 140 is connected to a third driver 230 as shown in FIG. 4 and driven and rotated about the third axis A3 by the third driver 230. The swing arm 150 is connected to a fourth driver 240 as shown in FIG. 4 and driven and rotated about the fourth axis A4 by the fourth driver 240.

The tool mounting rotation arm 160 is connected to a fifth driver 250 as shown in FIG. 4 and driven and rotated about the fifth axis A5 by the fifth driver 250. The tool mounting portion 170 is connected to a sixth driver 260 as shown in FIG. 4 and driven and rotated about the sixth axis A6 by the sixth driver 260.

Note that the second, third, fourth, fifth and sixth drivers 220, 230, 240, 250 and 260 are not described since they have substantially the same configuration as the first driver 210 in driving principle although structures of the motor 211, the power transmission mechanism 212 and the like differ.

Here, the configuration of the fifth driver 250 for driving and rotating the tool mounting rotation arm 160 about the fifth axis A5 is described with reference to FIG. 5.

As shown in FIG. 5, the fifth driver 250 includes a motor 211, a power transmission mechanism 212 and an encoder 213. The motor 211, the power transmission mechanism 212 and the encoder 213 are built in the swing arm 150. The motor 211 rotates the swing arm 150 about a rotating shaft S1 in directions of arrows A based on a drive signal supplied from the robot controller 270.

The power transmission mechanism 212 includes a pulley 221, a timing belt 222 and a reduction mechanism 223. The pulley 221 is mounted on the rotating shaft S1 of the motor 211 and rotates in the directions of arrows A by the rotation of the motor 211. The timing belt 222 is mounted around the pulley 221 and the reduction mechanism 223 and moved in directions of arrows B by the rotation of the pulley 221 to transmit power to the reduction mechanism 223. The reduction mechanism 223 rotates the tool mounting rotation arm 160 in directions of arrows C about the fifth axis A5 while reducing the speed of the transmitted power.

Next, a structure necessary to position the tool mounting rotation arm 160 at a reference position according to the present invention is described with reference to FIGS. 1 and 2.

Upon positioning the tool mounting rotation arm 160 at the reference position, the mounting member 310 is mounted to the tool mounting portion 170 as shown in FIGS. 1A to 1C instead of the tool 180 shown in FIG. 3. The mounting member 310 includes a mounting member main body 311 and a collar portion 312.

The mounting member main body 311 has a substantially cylindrical shape, has a light emitter 320 mounted in an inner peripheral portion 313, and is inserted into an inner peripheral portion of the tool mounting portion 170. The collar portion 312 is provided around one end of the mounting member main body 311. The collar portion 312 comes into contact with a peripheral end of the tool mounting portion 170 to be fixed when the mounting member main body 311 is inserted into the tool mounting portion 170.

The mounting member 310 has the light emitter 320 mounted in the inner peripheral portion. The light emitter 320 is, for example, composed of a laser pointer and emits a light beam in a predetermined direction. The light beam is, for example, red visible light which is laser light and has high directivity and excellent convergence property.

The light emitter 320 is so mounted to the tool mounting portion 170 via the mounting member 310 that the light beam is emitted in a direction toward the swing arm 150. At this time, the light emitter 320 is so mounted to the tool mounting portion 170 via the mounting member 310 that an optical axis of the light beam substantially coincide with the sixth axis A6.

The light beam emitted from the light emitter 320 is irradiated to a light receiving portion 410 when the swing arm 150 is at a reference position relative to the tool mounting rotation arm 160. The light receiving portion 410 is provided on the fourth axis A4 on the swing arm 150.

Figure 2A:
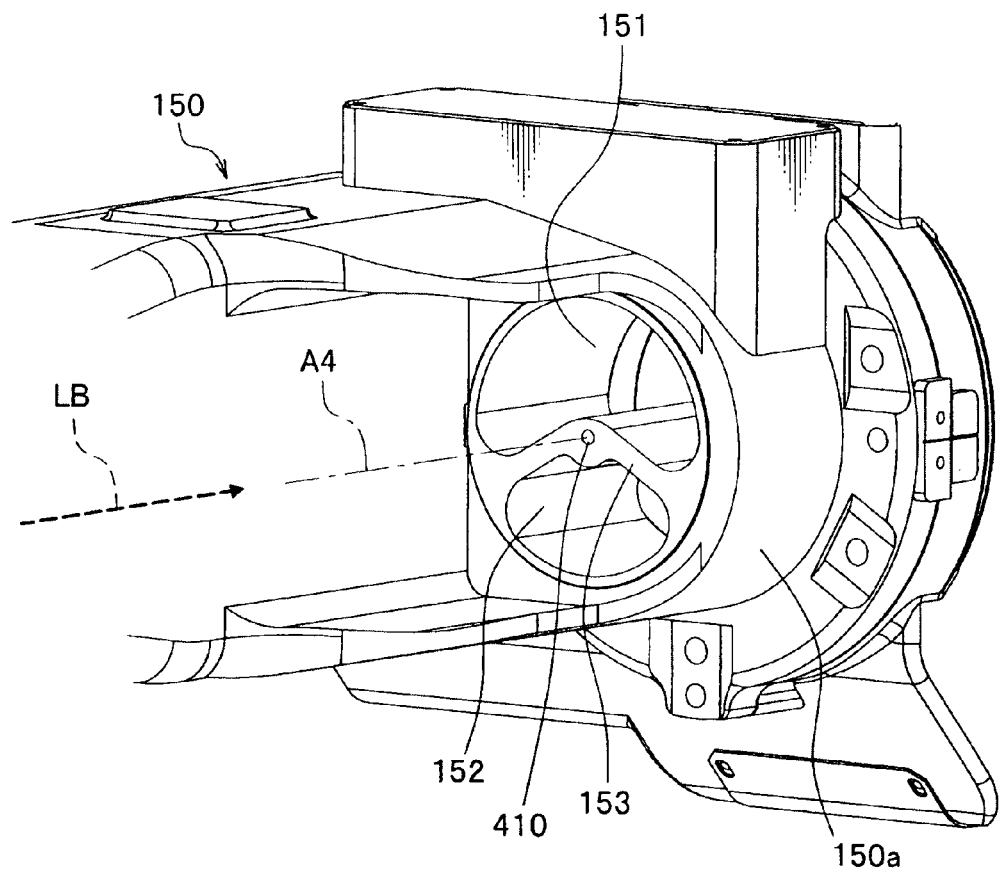
FIG. 2A is a perspective view of the light receiving portion and its vicinity and FIG. 2B is a sectional view of the light receiving portion.

As shown in FIG. 2, the swing arm 150 includes a cable insertion portion 150a for allowing the insertion of the cable 190 at a side toward the shoulder 140, and this cable insertion portion 150a is a member separate from the shoulder 140 and rotatable relative to the shoulder 140. Through holes 151, 152 partitioned by a partition wall 153 are provided in the cable insertion portion 150a. The through holes 151, 152 are holes penetrating through the swing arm 150 in a direction of the fourth axis A4 and enabling, for example, passage of the cable 190 connected to the tool 180 mounted to the tool mounting portion 170 as shown in FIG. 3. The partition wall 153 is formed to pass through the fourth axis A4 as shown in FIG. 2A and partitions between the through holes 151 and 152.

The light receiving portion 410 is formed on the fourth axis A4 on an end surface of the partition wall 153 toward the tool mounting rotation arm 160.

Figure 2B:
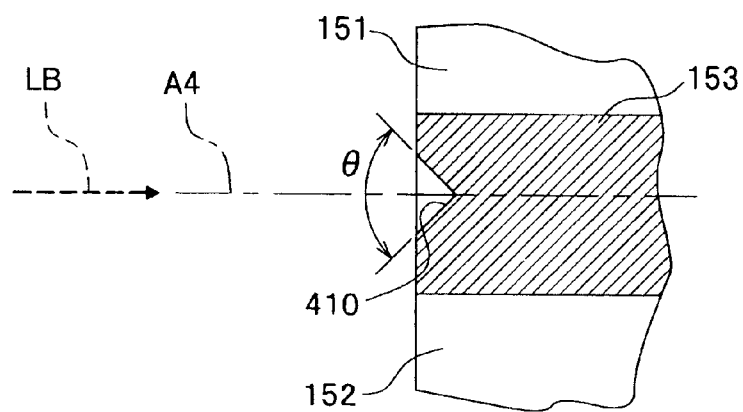

For example, as shown in FIG. 2B, the light receiving portion 410 is composed of a wedge-shaped hole open in an incident direction of a light beam LB, i.e. toward the tool mounting rotation arm 160 and tapered toward its bottom surface. Note that the light receiving portion 410 is so formed that a bottommost surface, which is the bottom of the hole, passes through the fourth axis A4 and a hole surface extending in an opening direction from the bottommost surface is at an angle θ. By forming the light receiving portion 410 to have such a tapered bottom surface, a position where the light beam LB should be positioned can be more easily confirmed. Note than the angle θ is preferably set at about 120°. By setting θ at 120°, whether or not the light beam LB is incident on the bottom surface can be more easily visually confirmed.

Next, a method for determining a reference position of the tool mounting rotation arm 160 is described with reference to FIG. 6.

An operation using the method for determining the reference position of the tool mounting rotation arm 160 according to this embodiment is performed at the time of newly manufacturing or installing the industrial robot 100 at a work site or at the time of maintenance or the like such as repair and part replacement of the industrial robot 100.

Upon performing the operation using the method for determining the reference position of the tool mounting rotation arm 160, an operator removes the tool 180 shown in FIG. 3 and mounted to the tool mounting portion 170, mounts the light emitter 320 to the mounting member 310 and mounts the mounting member 310 having the light emitter 320 mounted thereto to the tool mounting portion 170 as shown in FIG. 6A as an advance preparation. Then, a light beam LB is caused to be emitted from the light emitter 320 mounted to the mounting member 310.

In a state where the light beam LB is emitted from the light emitter 320, the operator gradually rotates the tool mounting rotation arm 160 in a direction of arrow X2 about the fifth axis A5 as shown in FIG. 6B so that the light beam LB emitted from the light emitter 320 is irradiated to the center of the light receiving portion 410 while operating the operation unit 280. In this way, the tool mounting rotation arm 160 is positioned at the reference position relative to the swing arm 150. Subsequently, the operator performs a resetting operation with the tool mounting rotation arm 160 positioned at the reference position relative to the swing arm 150.

For example, as shown in FIG. 6A, the light beam LB passing on the sixth axis A6 is irradiated to a position displaced by a distance E from the light receiving portion 410 in a state where the tool mounting rotation arm 160 is displaced by an angle Δθ in a direction of arrow X1 relative to the swing arm 150, i.e. the sixth axis A6 is displaced by the angle Δθ in the direction of arrow X1 relative to the fourth axis A4.

Since the light beam LB emitted from the light emitter 320 is not irradiated to the light receiving portion 410 in the state shown in FIG. 6A, the operator gradually rotates the tool mounting rotation arm 160 in the direction of arrow X2 shown in FIG. 6B about the fifth axis A5 by operating the operation unit 280 while visually confirming the incidence position of the light beam LB emitted from the light emitter 320.

When the tool mounting rotation arm 160 is rotated by the angle Δθ in the direction of arrow X2 about the fifth axis A5 by the operation of the operation unit 280 by the operator as shown in FIG. 6B, the light beam LB emitted from the light emitter 320 is irradiated to the light receiving portion 410. The operator stops the rotation of the tool mounting rotation arm 160 by operating the operation unit 280 when visually confirming that the light beam LB emitted from the light emitter 320 is irradiated to the light receiving portion 410. By coincidence of the light beam LB from the light emitter 320 with the light receiving portion 410, the position of the tool mounting rotation arm 160 is so adjusted that the sixth axis A6 and the fourth axis A4 are aligned on a straight line.

Subsequently, the operator performs a resetting operation by operating the operation unit 280 in a state where the light beam LB from the light emitter 320 is irradiated to the center of the light receiving portion 410. The resetting operation is to reset a count value of pulses from the encoder 230 of the fifth driver 250 of the robot controller 270, for example, to "0" by the operation of the operation unit 280.

The operator removes the mounting member 310 from the tool mounting portion 170 when finishing the resetting operation. In this way, the positioning operation of the tool mounting rotation arm 160 is finished.

Next, adjustment accuracy by the method for positioning the tool mounting rotation arm 160 according to this embodiment is described with reference to FIG. 7.

For example, as one method, a tool mounting rotation arm 710 which rotates about a rotation axis A21 relative to a swing arm 720 is positioned relative to the swing arm 720 at a position at a distance r1 from the rotation axis A21 as a center of rotation of the tool mounting rotation arm 710. Here, the distance r1 is, for example, about 50 mm. If a distances of displacement in FIG. 7A is 0.5 mm, an adjustment angle x about the rotation axis A21 is:

$$x = \epsilon/r1 = 0.5/50 = 0.01 [rad].$$

Figure 7A:
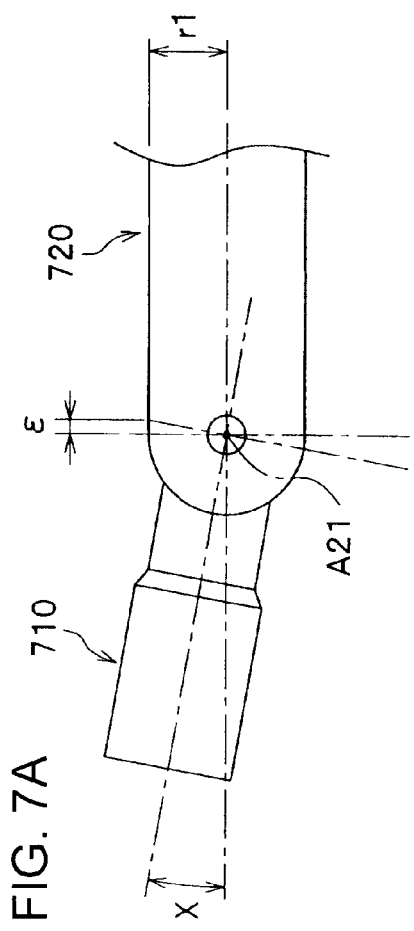
FIG. 7A is a side view of arms showing conventional adjustment accuracy and FIG. 7B is a side view of arms showing adjustment accuracy of the present invention.
Figure 7B:
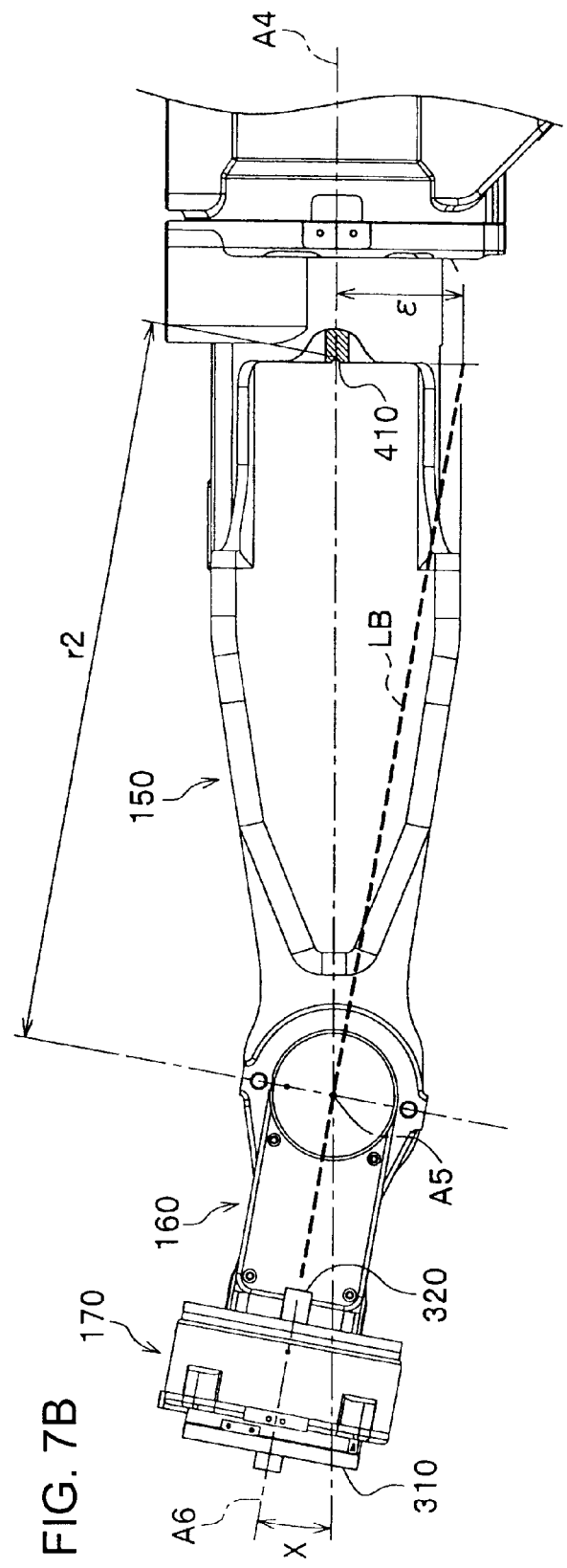

On the contrary, in this embodiment, a distance r2 from the fifth axis A5 to the light receiving portion 410 can be about 400 mm as shown in FIG. 7B.

Thus, if a distance c of displacement of the light beam LB from the light receiving portion 410 is set at 0.5 mm as in FIG. 7A, an adjustment angle x about the fifth axis A5 is:

$$x = \epsilon/r2 = 0.5/400 = 0.00125 [rad].$$

In this way, according to the industrial robot 100 of this embodiment, adjustment accuracy can be improved since a large distance r2 from the fifth axis A5 to the light receiving portion 410 can be ensured.

Note that the count value is retained in a register or the like built in the robot controller 270 and this count value is reset to "0". Thus, the robot controller 270 recognizes that a rotation amount of the tool mounting rotation arm 160 is "0", i.e. the tool mounting rotation arm 160 is at the reference position when the rotational position of the tool mounting rotation arm 160 about the fifth axis A5 is such that the fourth axis A4 and the sixth axis A6 coincide.

As described above, according to this embodiment, accuracy in adjusting the reference position of the tool mounting rotation arm 160 can be improved since a long distance from the fifth axis A5 to the light receiving portion 410 can be ensured. Further, since the number of necessary parts is extremely small, a mounting error and the like become smaller and accuracy in adjusting the reference position of the tool mounting rotation arm 160 can be improved. Furthermore, the relative positions of the swing arm 150 and the tool mounting rotation arm 160 are adjusted and there is no influence of adjustment accuracy of the third axis A3, wherefore reference position adjustment accuracy can be improved.

If the light emitter 320 is, for example, composed of a laser pointer, adjustment accuracy can be improved by condensing a light beam emitted from the laser pointer so that a diameter of the light beam, which is normally about 2 mm, is reduced to about 0.5 mm.

In this embodiment, the operator positions the tool mounting rotation arm 160 directly or using the operation unit 280 by rotating it about the fifth axis A5 relative to the swing arm 150 while visually confirming the irradiation of the light beam emitted from the light emitter 320 to the light receiving portion 410. However, the tool mounting rotation arm 160 may be automatically positioned at the reference position using the robot controller 270.

A construction in the case of automatically positioning the tool mounting rotation arm 160 at the reference position using the robot controller 270 is described.

Figure 8:
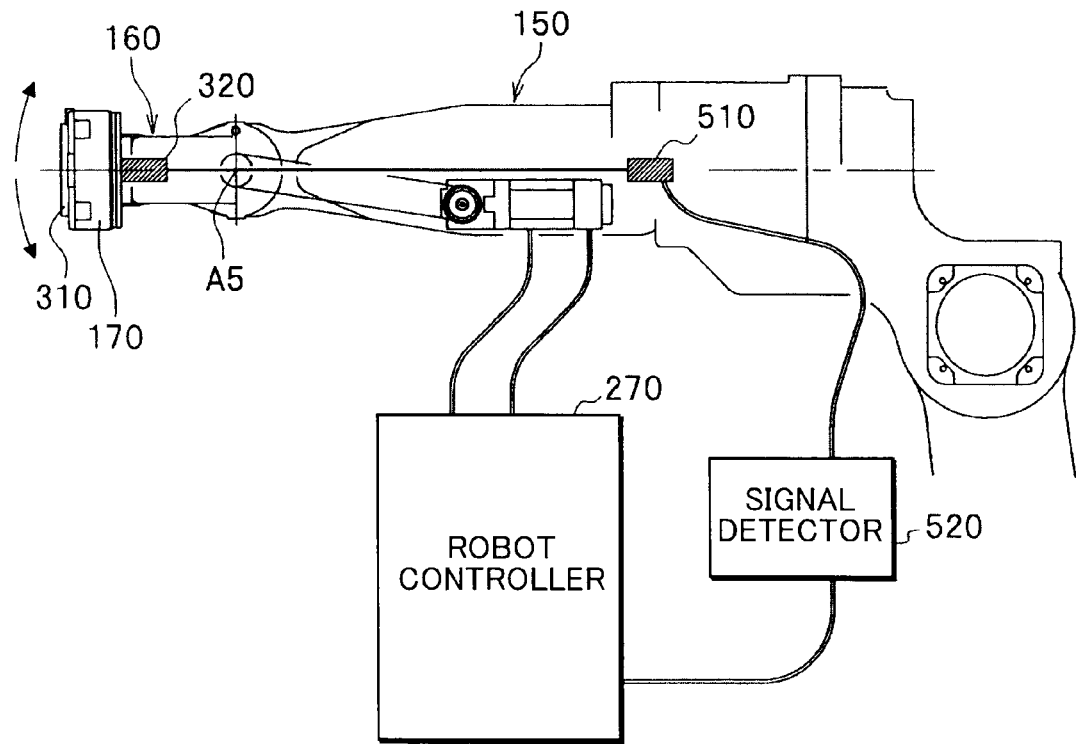
FIG. 8 is a diagram showing another embodiment of the industrial robot according to the present invention.

In the case of automatically positioning the tool mounting rotation arm 160 at the reference position using the robot controller 270, a photosensor 510 is mounted in the light receiving portion 410 shown in FIGS. 1 and 2 as shown in FIG. 8. The photosensor 510 is a device for receiving the light beam LB from the light emitter 320 and outputting a detection signal.

The detection signal output from the photosensor 510 is supplied to a signal detector 520. The signal detector 520 is a device for converting a detection signal from the photosensor 510 into a pulse and outputting the pulse. The reference position detection pulse converted in the signal detector 520 is supplied to the robot controller 270. The robot controller 270 controls the fifth driver 250 to rotate the tool mounting rotation arm 160 about the fifth axis A5 based on a start instruction of a positioning operation of the tool mounting rotation arm 160 by the operation of the operation unit 280 by the operator, monitors the supply of the reference position detection pulse from the signal detector 520 and resets a count value of pulses supplied from the encoder 213 of the fifth driver 250 to "0" when the reference position detection pulse from the signal detector 520 is supplied.

Next, an operation when the tool mounting rotation arm 160 is automatically positioned at the reference position using the robot controller 270 is described.

The operation of automatically positioning the tool mounting rotation arm 160 at the reference position using the robot controller 270 is performed, for example, at the time of installation or maintenance of the industrial robot 100. The operator first removes the tool 180 mounted to the tool mounting portion 170, mounts the light emitter 320 to the mounting member 310 and mounts the mounting member 310 having the light emitter 320 mounted thereto to the tool mounting portion 170 as an advance preparation. Then, a light beam LB is caused to be emitted from the light emitter 320 mounted to the mounting member 310.

Figure 9:
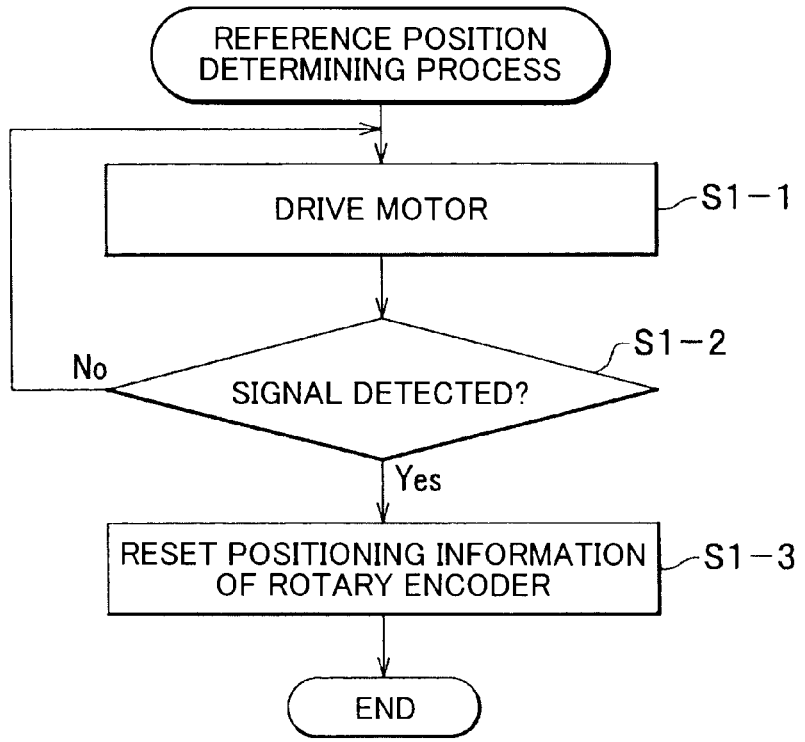
Figure 10A:
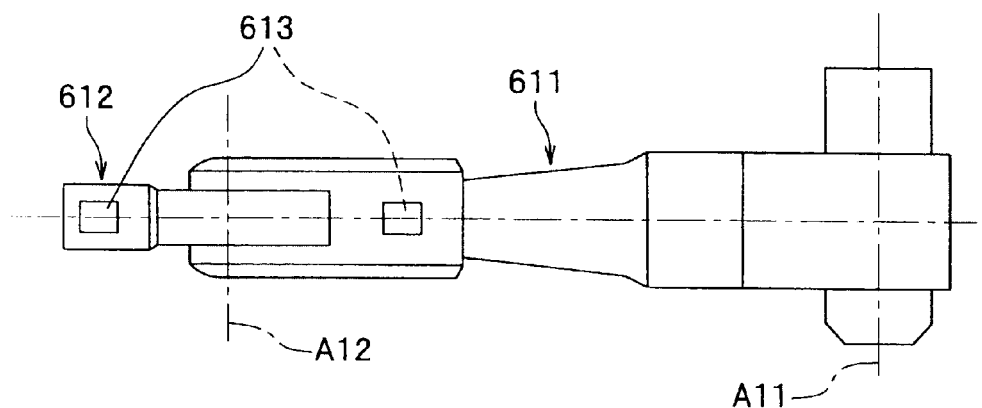
FIG. 10A is a plan view of an essential part of the industrial robot.
Figure 10B:
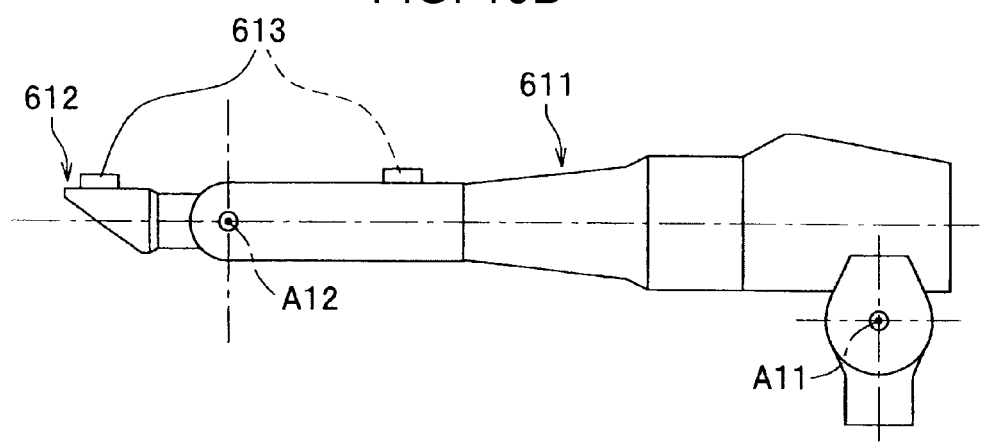
FIG. 10B is a side view of the essential part of the industrial robot in a normal adjusted state and FIG. 10C is a side view of the essential part of the industrial robot in the event of maladjustment.
Figure 10C:
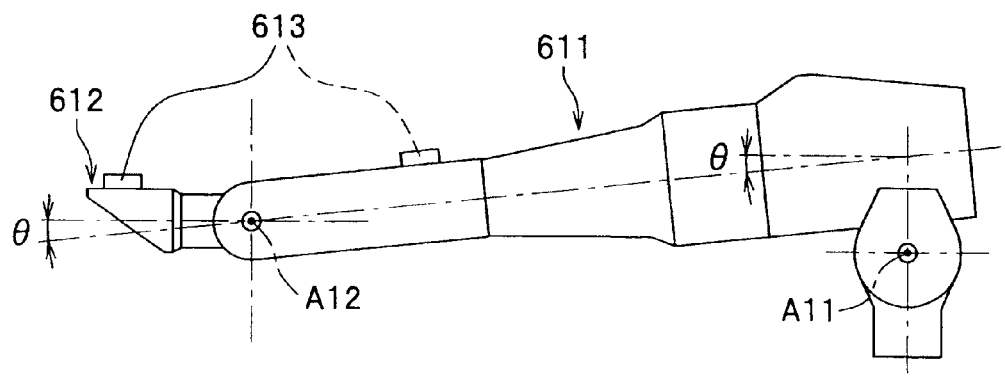

Subsequently, the operator instructs the robot controller 270 to start the positioning operation of the tool mounting rotation arm 160 by operating the operation unit 280. When the start of the positioning operation of the tool mounting rotation arm 160 is instructed using the operation unit 280, the robot controller 270 drives the motor 211 of the fifth driver 250 as shown in Step S1-1 of FIG. 9 to swing the tool mounting rotation arm 160 about the fifth axis A5.

In Step S1-2, the robot controller 270 monitors a pulse from the signal detector 520 in a state where the tool mounting rotation arm 160 is swung about the fifth axis A5. When the reference position detection pulse is supplied from the signal detector 520 in Step S1-2, the robot controller 270 can confirm that the light beam LB emitted from the light emitter 320 is irradiated to the photosensor 510. Thus, the robot controller 270 resets the count value of pulses supplied from the encoder 213 of the fifth driver 250 to "0" at a timing at which the reference position detection pulse is supplied from the signal detector 520 in Step S1-3. Thus, the count value of the pulses supplied from the encoder 213 of the fifth driver 250 are reset to "0" at the timing at which the light beam LB emitted from the light emitter 320 is irradiated to the photosensor 510, i.e. when the tool mounting rotation arm 160 is at the reference position, whereby the tool mounting rotation arm 160 can be automatically set at the reference position.

When the count value of the pulses supplied from the encoder 213 of the fifth driver 250 is reset to "0", the robot controller 270 stops a swinging movement of the tool mounting rotation arm 160 and finishes the automatic positioning operation of the tool mounting rotation arm 160. The operator removes the mounting member 310 from the tool mounting portion 170 when the automatic positioning operation of the tool mounting rotation arm 160 is finished.

In the above manner, the tool mounting rotation arm 160 is automatically positioned at the reference position. Note that a count value of the encoder 213 may be reset if the encoder 213 counts pulses and supplies the count value to the robot controller 270. In this case, the count value from the encoder 213 managed by the robot controller 270 may be reset with an offset set for the count value.

In summary, the present invention is directed to a method for determining a reference position of an arm of an industrial robot (100) to position a swing arm (150) and a tool mounting rotation arm (160) mounted to the swing arm (150) via a rotation axis (A5), comprising the steps of:

mounting a light emitter (320) to a mounting portion (170) provided at a predetermined position of the tool mounting rotation arm (160) such that a light beam (LB) is emitted toward the swing arm;

causing the light beam (LB) to be emitted from the light emitter (320);

providing a light receiving portion (410) for receiving the light beam (LB) from the light emitter (320) at a predetermined position of the swing arm (150) facing the mounting portion (170);

setting a predetermined allowable range on the light receiving portion; and positioning the swing arm (150) and the tool mounting rotation arm (160) such that the light beam (LB) from the light emitter (320) is irradiated to the set allowable range.

According to the above construction (process), the reference position of the tool mounting rotation arm can be determined without depending on the inclination of the swing arm by irradiating the light beam to the light receiving portion and positioning the tool mounting rotation arm relative to the swing arm. Further, since the light beam has excellent linearity, a long distance from a pivot shaft of the tool mounting rotation arm to the light receiving portion as an adjustment part can be ensured. Therefore, adjustment accuracy can be improved.

In one aspect of the present invention, the light receiving portion may include a hole open in an incident direction of the light beam and tapered toward a bottom surface thereof.

According to the above construction, by shaping the light receiving portion to be tapered toward the bottom surface, the center of the light receiving portion is easily visually confirmed. Thus, a positioning operation can be easily performed.

In the method for determining the reference position of the arm of the industrial robot according to the present invention, the swing arm may rotate about a first motion axis orthogonal to the rotation axis; the mounting portion may be a tool mounting portion which is provided on the tool mounting rotation arm and rotates about a second motion axis crossing the first motion axis on the rotation axis and to which a tool is to be mounted; the light emitter may be mounted to the tool mounting portion via a mounting member and may emit a light beam toward the swing arm on the second motion axis; and the light receiving portion may be provided on the first motion axis on the swing arm to face toward the tool mounting rotation arm.

According to the above construction, it is not necessary to separately provide a mechanism for reference position adjustment by mounting the light emitter to the tool mounting portion via the mounting member such that the light beam is emitted toward the swing arm on the second motion axis and providing the light receiving portion on the first motion axis on the swing arm to face toward the tool mounting rotation arm. Thus, it is possible to reduce the number of parts and errors, wherefore an adjustment can be accurately made.

Further, in the method for determining the reference position of the arm of the industrial robot according to the present invention, the swing arm may include a plurality of through holes partitioned by a partition wall penetrating in a direction of the first motion axis and passing on the first motion axis and including at least one through hole through which a cable connected to the tool is inserted; and the light receiving portion may be provided on the first motion axis on an end surface of the partition wall toward the tool mounting rotation arm.

According to the above construction, it is not necessary to separately provide a part for reference position adjustment by providing the light receiving portion on the first motion axis on the tool mounting rotation arm-side end surface of the partition wall partitioning between the plurality of through holes. Thus, it is possible to reduce the number of parts and errors, wherefore an adjustment can be accurately made.

An industrial robot according to the present invention is an industrial robot with a swing arm and a tool mounting rotation arm mounted to the swing arm via a rotation axis, comprising a mounting portion which is provided at a position of a tool mounting portion of the tool mounting rotation arm and to which a light emitter is so mounted that a light beam from the light emitter is emitted toward the swing arm; and a light receiving portion provided at a predetermined position of the swing arm facing the mounting portion of the tool mounting rotation arm and adapted to receive the light beam from the light emitter mounted to the mounting portion; wherein the swing arm and the tool mounting rotation arm are respectively positioned at reference positions when the light beam from the light emitter mounted to the mounting portion is irradiated to a allowable range of the light receiving portion set beforehand.

According to the above construction of the present invention, by automatically adjusting the reference position of the tool mounting rotation arm by rotating the tool mounting rotation arm relative to the swing arm so that the light beam emitted from the light emitter mounted to the tool mounting rotation arm is irradiated to the allowable range of the light receiving portion provided in the swing arm set beforehand, an adjusting operation can be more accurately performed in a shorter time than by visual confirmation of an irradiated position on the light receiving portion by a person.

This application is based on Japanese Patent Application Serial No. 2010-093151 filed with Japanese Patent Office on Apr. 14, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for determining a reference position of an arm of an industrial robot to position a swing arm and a tool mounting rotation arm mounted to the swing arm via a rotation axis, comprising the steps of:
   mounting a light emitter to a mounting portion provided at a predetermined position of the tool mounting rotation arm such that a light beam is emitted toward the swing arm;
   causing the light beam to be emitted from the light emitter;
   providing a light receiving portion for receiving the light beam from the light emitter at a predetermined position of the swing arm facing the mounting portion;
   positioning the swing arm and the tool mounting rotation arm such that the light beam from the light emitter is irradiated to the light receiving portion.

2. A method according to claim 1, wherein the light receiving portion includes a hole open in an incident direction of the light beam and tapered toward a bottom surface thereof.

3. A method according to claim 1, wherein:
   the swing arm rotates about a first motion axis orthogonal to the rotation axis;
   the mounting portion is a tool mounting portion which is provided on the tool mounting rotation arm and rotates about a second motion axis crossing the first motion axis on the rotation axis and to which a tool is to be mounted;
   the light emitter is mounted to the tool mounting portion via a mounting member and emits a light beam toward the swing arm on the second motion axis; and
   the light receiving portion is provided on the first motion axis on the swing arm to face toward the tool mounting rotation arm.

4. A method according to claim 3, wherein:
   the swing arm includes a plurality of through holes partitioned by a partition wall penetrating in a direction of the first motion axis and passing on the first motion axis and including at least one through hole through which a cable connected to the tool is inserted; and
   the light receiving portion is provided on the first motion axis on an end surface of the partition wall toward the tool mounting rotation arm.

5. An industrial robot, comprising:
   a swing arm;
   a tool mounting rotation arm mounted to the swing arm via a rotation axis, a mounting portion which is provided at a position of a tool mounting portion of the tool mounting rotation arm and to which a light emitter is so mounted that a light beam from the light emitter is emitted toward the swing arm; and a light receiving portion provided at a predetermined position of the swing arm facing the mounting portion of the tool mounting rotation arm and adapted to receive the light beam from the light emitter;

wherein the swing arm and the tool mounting rotation arm are respectively positioned at reference positions when the light beam from the light emitter mounted to the mounting portion is irradiated to the light receiving portion.

6. An industrial robot according to claim 5, wherein the light receiving portion includes a hole open in an incident direction of the light beam and tapered toward a bottom surface thereof.

7. An industrial robot according to claim 5, wherein:

the swing arm rotates about a first motion axis orthogonal to the rotation axis;

the mounting portion is a tool mounting portion which is provided on the tool mounting rotation arm and rotates about a second motion axis crossing the first motion axis on the rotation axis and to which a tool is to be mounted;

the light emitter is mounted to the tool mounting portion via a mounting member and emits a light beam toward the swing arm on the second motion axis; and the light receiving portion is provided on the first motion axis on the swing arm to face toward the tool mounting rotation arm.

8. An industrial robot according to claim 7, wherein:

the swing arm includes a plurality of through holes partitioned by a partition wall penetrating in a direction of the first motion axis and passing on the first motion axis and including at least one through hole through which a cable connected to the tool is inserted; and the light receiving portion is provided on the first motion axis on an end surface of the partition wall toward the tool mounting rotation arm.

\* \* \* \* \*